US009162420B2

(12) United States Patent
Müller et al.

(10) Patent No.: US 9,162,420 B2
(45) Date of Patent: Oct. 20, 2015

(54) MULTILAYER LAMINATED MATERIAL WITH INHERENTLY LATENT PROTECTION AGAINST DEFORMATION UNDER THERMAL ACTION FOR COMPENSATING THE BIMETALLIC EFFECT

(75) Inventors: Klaus Müller, Sulzbach (DE); Ines Schwarz, Frankfurt (DE)

(73) Assignee: Basell Poliolefine Italia S.r.l., Milan (IT)

( * ) Notice: Subject to any disclaimer, the term of this patent is extended or adjusted under 35 U.S.C. 154(b) by 1074 days.

(21) Appl. No.: 12/312,881

(22) PCT Filed: Nov. 29, 2007

(86) PCT No.: PCT/EP2007/010367
§ 371 (c)(1),
(2), (4) Date: May 29, 2009

(87) PCT Pub. No.: WO2008/067949
PCT Pub. Date: Jun. 12, 2008

(65) Prior Publication Data
US 2010/0075558 A1   Mar. 25, 2010

Related U.S. Application Data

(60) Provisional application No. 60/897,960, filed on Jan. 29, 2007.

(30) Foreign Application Priority Data

Dec. 6, 2006   (DE) .......................... 10 2006 057 822

(51) Int. Cl.
| B32B 27/34 | (2006.01) |
| B32B 5/14 | (2006.01) |
| B32B 5/02 | (2006.01) |
| B32B 7/12 | (2006.01) |
| B32B 15/085 | (2006.01) |
| B32B 21/08 | (2006.01) |

(Continued)

(52) U.S. Cl.
CPC .............. *B32B 5/14* (2013.01); *B29C 45/14467* (2013.01); *B32B 5/022* (2013.01); *B32B 5/024* (2013.01); *B32B 7/12* (2013.01); *B32B 15/085* (2013.01); *B32B 21/08* (2013.01); *B32B 21/10* (2013.01); *B32B 27/06* (2013.01); *B32B 27/12* (2013.01); *B32B 27/18* (2013.01); *B32B 27/286* (2013.01); *B32B 27/288* (2013.01); *B32B 27/304* (2013.01); *B32B 27/308* (2013.01); *B32B 27/32* (2013.01); *B32B 27/34* (2013.01); *B32B 27/36* (2013.01); *B32B 27/40* (2013.01); *B29C 45/14778* (2013.01); *B29C 45/14811* (2013.01); *B29C 2045/14532* (2013.01); *B29K 2105/0818* (2013.01); *B29K 2705/00* (2013.01); *B29K 2711/14* (2013.01); *B29K 2715/006* (2013.01); *B32B 2262/065* (2013.01); *B32B 2262/067* (2013.01); *B32B 2262/101* (2013.01); *B32B 2307/702* (2013.01); *B32B 2307/704* (2013.01); *Y10T 428/258* (2015.01); *Y10T 428/266* (2015.01); *Y10T 428/269* (2015.01); *Y10T 428/27* (2015.01); *Y10T 428/31507* (2015.04); *Y10T 428/31551* (2015.04); *Y10T 428/31678* (2015.04); *Y10T 428/31725* (2015.04); *Y10T 428/31786* (2015.04); *Y10T 428/31935* (2015.04); *Y10T 428/31938* (2015.04); *Y10T 428/31942* (2015.04); *Y10T 428/31989* (2015.04); *Y10T 442/339* (2015.04); *Y10T 442/3854* (2015.04)

(58) Field of Classification Search
CPC ........ B32B 5/022; B32B 5/024; B32B 5/028; B32B 21/10; B32B 25/10; B32B 27/12; B32B 2260/02; B32B 2262/02; B32B 2262/0253; B32B 2250/04; B32B 5/14; B32B 27/40; B32B 2/288; B32B 27/32; B32B 27/34; B32B 27/286; B32B 27/18; B32B 27/304; B32B 21/08; B32B 16/085; B32B 7/12; B32B 27/06; B32B 2307/702; B32B 2262/101; B32B 2252/065; B32B 2262/067; B29C 45/14467; B29C 2045/14532; B29C 45/14778; B29C 45/14811; B29K 2711/14; B29K 2715/006; B29K 2705/00; B29K 2105/0818; Y10T 428/31935; Y10T 428/31678; Y10T 442/339; Y10T 428/31725; Y10T 428/31942; Y10T 428/31786; Y10T 428/31989; Y10T 442/3854; Y10T 428/31551; Y10T 428/31938; Y10T 428/31507; Y10T 428/27; Y10T 428/258; Y10T 428/269; Y10T 428/366
USPC ................ 428/537.1; 442/394–399, 286–294
See application file for complete search history.

(56) References Cited

U.S. PATENT DOCUMENTS 4,151,137 A *   4/1979   Duvdevani et al. ........... 524/399
4,427,743 A      1/1984   Katsuki et al.
(Continued)

FOREIGN PATENT DOCUMENTS

DE          19529240 A1    2/1997
EP            426638        5/1991
(Continued)

*Primary Examiner* — Elizabeth M Cole

(57) ABSTRACT

A solvent-free multilayer laminated material comprises a lower substrate layer comprising a thermoplastic polymer or a mixture of thermoplastic polymers, an intermediate layer arranged thereon and comprising a flexible material, a further fibrous intermediate layer comprising plastic, which is provided with an adhesive material and an upper layer comprising metal, comprising plastic or comprising wood or wood-like materials. It does surprisingly not show any deformation even under exposure to temperatures of about 80° C. over a period of up to 40 days and can be used for the production of articles of furniture, floor coverings, wall panels or shaped articles for the electrical, construction or automotive industry.

12 Claims, No Drawings

(51) Int. Cl.
  *B32B 21/10*   (2006.01)
  *B32B 27/18*   (2006.01)
  *B32B 27/30*   (2006.01)
  *B32B 27/32*   (2006.01)
  *B32B 27/28*   (2006.01)
  *B32B 27/36*   (2006.01)
  *B32B 27/40*   (2006.01)
  *B29C 45/14*   (2006.01)
  *B32B 27/06*   (2006.01)
  *B32B 27/12*   (2006.01)
  *B29K 105/08*  (2006.01)
  *B29K 705/00*  (2006.01)
  *B29K 711/14*  (2006.01)

(56) References Cited

U.S. PATENT DOCUMENTS

| | | | |
|---|---|---|---|
| 4,443,507 A | 4/1984 | Yamada et al. | |
| 4,824,722 A | 4/1989 | Jarrett | |
| 5,519,100 A | 5/1996 | Ewen et al. | |
| 5,561,092 A | 10/1996 | Ewen et al. | |
| 5,591,795 A | 1/1997 | Nomura et al. | |
| 5,667,896 A | 9/1997 | Carter et al. | |
| 6,641,629 B2 * | 11/2003 | Safta et al. | 51/298 |
| 2004/0108623 A1 | 6/2004 | Deeter et al. | |
| 2004/0198919 A1 | 10/2004 | Pelliconi et al. | |
| 2005/0091935 A1 | 5/2005 | Amano et al. | |
| 2005/0170191 A1 | 8/2005 | Huchet | |
| 2005/0281997 A1 * | 12/2005 | Grah | 428/215 |

FOREIGN PATENT DOCUMENTS

| | | |
|---|---|---|
| EP | 427697 | 5/1991 |
| EP | 0844280 | 5/1998 |
| GB | 1 369 285 | 10/1974 |
| JP | 63054218 | 3/1988 |
| WO | WO 00/47401 | 8/2000 |
| WO | WO-2008074430 | 12/2007 |

* cited by examiner

MULTILAYER LAMINATED MATERIAL WITH INHERENTLY LATENT PROTECTION AGAINST DEFORMATION UNDER THERMAL ACTION FOR COMPENSATING THE BIMETALLIC EFFECT

CROSS-REFERENCE TO RELATED APPLICATIONS

This application is the U.S. national stage under 35 U.S.C. §371 of International Application PCT/EP2007/010367, filed Nov. 29, 2007, claiming priority to German Patent Application No. 10 2006 057 822.8, filed Dec. 6, 2006, and provisional U.S. Appl. No. 60/897,960, filed Jan. 29, 2007; the disclosures of International Application PCT/EP2007/010367, German Patent Application No. 10 2006 057 822.8, and provisional U.S. Appl. No. 60/897,960, each as filed, are incorporated herein by reference.

The present invention relates to a novel multilayer laminated material which is provided with an immanent, inherent protection against stress and distortion differences which are produced under the influence of changes of temperature within laminates of different materials in the presence of different coefficients of thermal expansion of the different materials within the laminate. Such stress or distortion differences usually result in deformation of the laminated material, which is approximately comparable to a bimetal if no countermeasures are taken.

Furthermore, the invention relates to a process for the production of this multilayer laminated material and its use for the production of furniture, floor coverings, wall panels or shaped articles for the electrical, construction or automotive industry.

Many laminated materials which are known in the prior art and consist of different materials firmly adhering to one another have the disadvantage that, particularly when the different materials, such as metal and plastic, whether of the thermoplastic or thermosetting plastic type, are bonded to one another on one side, a sort of bimetallic effect occurs on changes in the ambient temperature, which bimetallic effect results in stress effects or distortion differences, which in the end lead to a change in the external geometry of the laminated materials. The change in the external geometry of the laminated materials is, however, highly undesirable and has a very adverse effect on the intended use of such materials or even makes such use completely impossible.

For numerous industrial applications, for example in the automotive or electrical industry, there is therefore still an urgent need for multilayer laminates which firstly have no shrinkage or distortion problems in the case of temperature variations over a wide range, which are also free of solvents, which have high mechanical strength in combination with high bond strength and which secondly also have a simple, economical and recyclable composition.

The object of the invention was therefore to produce a multilayer laminate which is resistant to deformations and changes in its geometry under the action of temperature variations, which retains this resistance over a wide temperature range and a long duration and which also fulfills the other expectations of the industry with regard to the mechanical properties and the capability of environmentally compatible disposal.

This object is achieved by a multilayer laminated material which is free of solvents and which comprises a lower substrate layer comprising a thermoplastic polymer, an intermediate layer arranged thereon and comprising a flexible material, a further fibrous intermediate layer which comprises plastic and is provided with an adhesive material, and an upper layer of metal, of plastic, in particular thermosetting plastic, or of wood or wood-like material.

The multilayer laminate according to the invention having such a composition surprisingly exhibits not the slightest deformation even after repeated treatment at temperatures of about 80° C. for a duration of up to 40 days.

The lower substrate layer may comprise from 1 to 60% by weight, preferably from 5 to 50% by weight, particularly preferably from 10 to 40% by weight, based in each case on the weight of the lower substrate layer, of reinforcing fillers. Examples of such reinforcing fillers are barium sulfate, magnesium hydroxide, talc having a mean particle size in the range of from 0.1 to 10 μm, measured according to DIN 66 115, wood, flax, chalk, glass fibers, coated glass fibers, short glass fibers or long glass fibers, glass beads or mixtures of these. In addition, the lower substrate layer may also comprise further additives, such as light stabilizers, UV stabilizers and heat stabilizers, pigments, carbon blacks, lubricants and processing assistants, flameproofing agents, blowing agents and the like in the respective expedient amounts. According to the invention, the lower substrate layer itself consists of thermoplastic polymers.

According to the invention, polypropylene (PP), polyethylene (PE), polyvinyl chloride (PVC), polysulfones, polyether ketones, polyesters, such as polyethylene terephthalate, polybutylene terephthalate or polyalkylene naphthalate, polycycloolefins, polyacrylates, polymethacrylates, polyamides, such as poly-epsilon-caprolactam or polyhexamethylenadipamide or polyhexamethylenesebacamide, polycarbonate, polyurethanes, polyacetals, such as polyoxymethylene (POM), or polystyrene (PS) are advantageously used as thermoplastic polymers. In principle, homopolymers and copolymers are suitable as thermoplastic polymers. In the context, copolymers of propylene and ethylene or of ethylene or propylene and other olefins having 4 to 10 carbon atoms, or copolymers or terpolymers of styrene and smaller proportions of butadiene, alpha-methylstyrene, acrylonitrile, vinylcarbazole or esters of acrylic, methacrylic or itaconic acid are particularly worthy of mention. For improving the cost-efficiency of its production, the lower substrate layer of the multilayer laminated material according to the invention may also comprise said polymers in recycled form in amounts of up to 60% by weight, based on the total weight of the lower substrate layer.

According to the invention, the designation polyoxymethylene (POM) is understood as meaning homopolymers as well as copolymers of aldehydes, such as formaldehyde or acetaldehyde, but preferably of cyclic acetals. For POM, it is a characteristic that repeating carbon-oxygen bonds are typical of the appearance of the molecular chain. The melt flow index (MI) of POM is usually in the range of from 5 to 50 g/10 min, preferably from 5 to 30 g/10 min, measured according to ISO 1133 at a temperature of 230° C. and under a load of 2.16 kg.

If polyesters are to be used for the lower substrate layer of the multilayer laminated material according to the invention, polyethylene terephthalate (PET) or polybutylene terephthalate (PBT) are preferred for this purpose. Both are high molecular weight esterification products of terephthalic acid and ethylene glycol or butylene glycol, respectively. Polyesters particularly suitable according to the invention have an MI in the range of from 5 to 50 g/10 min, preferably from 5 to 30 g/10 min, measured according to DIN 1133 at a temperature of 230° C. and under a load of 2.16 kg.

Suitable copolymers of styrene for the lower substrate layer of the multilayer laminated material are in particular copolymers comprising up to 45% by weight, preferably comprising up to 20% by weight, of acrylonitrile incorporated in the form of polymerized units. Such copolymers typically have an MI in the range of from 1 to 25 g/10 min, preferably from 4 to 20 g/10 min, measured according to DIN 1133 at a temperature of 230° C. and a load of 2.16 kg.

Further terpolymers of styrene comprise up to 35% by weight, in particular up to 20% by weight, of acrylonitrile incorporated in the form of polymerized units and up to 35% by weight, preferably up to 30% by weight, of butadiene. Such terpolymers are also referred to as ABS for short and typically have an MI in the range of from 1 to 40 g/10 min, preferably from 2 to 30 g/10 min, measured according to DIN 1133 at a temperature of 230° C. and under a load of 2.16 kg.

Further thermoplastic polymers used for the lower substrate layer of the multilayer laminated material according to the invention are in particular polyolefins, such as PE and PP, of which PP is particularly preferably used. According to the invention, PP is understood as meaning homopolymers as well as copolymers of propylene. Copolymers comprise minor amounts of monomers, such as 1-olefins having 2 or 4 to 8 carbon atoms, copolymerizable with propylene. If required, two or more comonomers may also be used.

Homopolymers of propylene or copolymers of propylene and up to 50% by weight of further 1-olefins having up to 8 carbon atoms may be mentioned as thermoplastic polymers particularly suitable for the lower substrate layer of the multilayer laminated material. Such copolymers are usually random copolymers, but may also be block copolymers.

The polymerization for the preparation of PP can usually be effected under a pressure in the range of from 1 to 100 bar (from 0.1 to 10 MPa) in suspension or in the gas phase and in the presence of a Ziegler-Natta catalyst system. Preferred catalyst systems are those which, in addition to a titanium-containing solid component, also comprise cocatalysts in the form of organic aluminum compounds and electron donor compounds.

Ziegler-Natta catalyst systems comprise as a rule a titanium-containing solid component, in particular halides or alcoholates of trivalent or tetravalent titanium, and also a halogen-containing magnesium compound, inorganic oxides, such as silica gel, as support material and electron donor compounds. In particular, carboxylic acid derivatives or ketones, ethers, alcohols or organosilicon compounds may be mentioned as electron donor compounds.

The titanium-containing solid component can be prepared by known processes. It is preferably prepared by a process which is described in more detail in DE 195 29 240.

Cocatalysts suitable for the Ziegler-Natta catalyst systems are, in addition to trialkylaluminum, also those compounds in which an alkyl group is replaced by an alkoxy group or by a halogen atom, such as chlorine or bromine. The alkyl groups may be identical or different. Linear or branched alkyl groups are also suitable. According to the invention, trialkylaluminum compounds whose alkyl groups comprise 1 to 8 carbon atoms, for example triethylaluminum, triisobutylaluminum, trioctylaluminum or methyldiethylaluminum or mixtures thereof, are preferably used.

However, the preparation of PP can also be effected in the presence of metallocene as the catalyst. Metallocenes are to be understood as meaning complex compounds having a layer structure and comprising metals from the subgroups of the Periodic Table of the Elements plus organic, preferably aromatic, ligands. For their use for the preparation of PP, the metallocene complexes are expediently applied to a support material. The inorganic oxides which are also used for the preparation of the titanium-containing solid component in Ziegler-Natta catalysts have also proven useful as support material.

Metallocenes usually used comprise, as a central atom, titanium, zirconium or hafnium, of which zirconium is preferred. The central atom is linked via a pi bond to at least one pi system which is embodied by a cyclopentadienyl group. The cyclopentadienyl group is in most cases provided with additional substituents by means of which the activity of the catalyst can be controlled. Preferred metallocenes comprise central atoms which are bonded via two identical or different pi bonds to two pi systems which may simultaneously also be part of corresponding heteroaromatic systems.

In principle, any compound which can convert the neutral metallocene into a cation and stabilize the latter is suitable as a cocatalyst for the metallocene. In addition, the cocatalyst or the anion formed from it should undergo no further reactions with the metallocenium cation formed, which can be referred to in EP 427 697. A preferably used cocatalyst is an aluminum compound and/or a boron compound.

The boron compound preferably has the formula $R^{18}_x NH_{4-x} BR^{19}_4$, $R^{18}_x PH_{4-x} BR^{19}_4$, $R^{18}_3 CBR^{19}_4$ or $BR^{19}_3$, where x is a number from 1 to 4, preferably 3, the radicals $R^{18}$ are identical or different, preferably identical, and are $C_1$-$C_{10}$-alkyl or $C_6$-$C_{18}$-aryl, or two radicals $R^{18}$, together with the atoms linking them, form a ring, and the radicals $R^{19}$ are identical or different, preferably identical, and are $C_6$-$C_{18}$-aryl which may be substituted by alkyl, haloalkyl or fluorine. In particular, $R^{18}$ is ethyl, propyl, butyl or phenyl and $R^{19}$ is phenyl, pentafluorophenyl, 3,5-bistrifluoromethylphenyl, mesityl, xylyl or tolyl. Boron compounds as a cocatalyst for metallocenes are described in EP 426 638.

Preferably used cocatalyst is an aluminum compound, such as an alumoxane and/or an alkylaluminum.

A particularly preferably used cocatalyst is an alumoxane, in particular of the linear type or of the cyclic type, it also being possible for organic radicals which are identical or different and may be hydrogen or a $C_1$-$C_{20}$-hydrocarbon group, such as a $C_1$-$C_{18}$-alkyl group, a $C_6$-$C_{18}$-aryl group or benzyl, to occur in both compounds.

The lower substrate layer of the multilayer laminated material according to the invention may be present in the form of an injection molded, extruded or pressed sheet in different thicknesses and sizes. Preferred layer thicknesses for the lower substrate layer are in the range from 1 to 20 mm, particularly preferably from 2 to 15 mm.

In particular, the flexible material suitable for the multilayer laminated material according to the instant invention comprises a mix of a crystalline polymer fraction and an elastomeric fraction, whereby the crystalline fraction is present in an amount of about 5 to 25% by weight and the elastomeric fraction is present in an amount of about 75 to 92% by weight, both calculated on total weight of the mix.

The crystalline fraction of the mix comprises a propylene homopolymer, having solubility in xylene at room temperature of less than 10% by weight, or the crystalline fraction comprises a copolymer of propylene and another linear or branched olefins having 2 or 4 to 10 carbon atoms, which copolymer comprises at least 85% by weight of propylene units and which copolymer has a solubility in xylene at room temperature of less that 15% by weight.

The elastomeric fraction of the mix comprises one or more elastomeric copolymers of ethylene with propylene or a $CH_2=CHR$ α-olefin, where R is a $C_2$-$C_8$ alkyl radical, and optionally minor quantities of a diene, or a copolymer of ethylene with propylene and said α-olefin, and optionally minor quantities of a diene, said copolymers containing 50% by weight or more of a fraction soluble in xylene at room temperature.

The flexible material suitable for the multilayer laminated material according to the instant invention has in particular a flexural modulus of lower than 60 MPa and a Shore A hardness of lower than 90.

In particular, the flexible material suitable for the multilayer laminated material according to the instant invention comprising the mix as described before are commercially available under the trade name SOFTELL. A preferably suitable flexible material has a preferred flexural modulus in the range from 15 to 50 MPa and a Shore A hardness in the range from 60 to 80 and a glass transition temperature $T_g$ of about less than minus 18° C., preferably minus 20° C. or less.

Measurement Methods:

The intrinsic viscosity is determined in tetrahydronaphthalene at a temperature of 135° C.

The flexural modulus and the glass transition temperature $T_g$ are determined by way of a device for dynamic-mechanical measurements DMTA of Polymer Laboratories under the following conditions:

Frequency measure: 1 Hz;
Scanning temperature: 2 K/min.

The polymer sample to be analyzed is made up of a 40×10×1 mm plaque taken from a sheet obtained by pressure molding with Carver press at a temperature of 200° C., under a pressure of 10 tons for a time period of 10 min, followed by subsequent cooling down at 100 K/min.

Shore A hardness is determined by ASTM D 2240.

The solubility at room temperature in % by weight, whereby room temperature means about 25° C., is determined by dissolving 2.5 g polymer in 250 ml xylene at a temperature of 135° C. under agitation. After 20 min, the solution is cooled down to 25° C. under stirring, thereafter it was allowed to settle for a time period of 30 min. Then, the precipitate was filtered with filter paper, the solution was evaporated under nitrogen and the residue was dried under vacuum at 80° C. until constant weight was reached. Thereafter, the weight percent of polymer soluble in xylene was calculated.

The fibrous intermediate layer of thermoplastic polymer expediently has a weight per unit area in the range from 10 to 200 g/m$^2$ and is provided with a solvent-free adhesive in an amount of from 5 to 200 g/m$^2$. According to the invention said intermediate layer increases the adhesive strength or the bonding strength by about 35% compared with the pure adhesive film. An expediently used intermediate layer may be a woven textile fabric or a randomly oriented fiber web or a felt-like fiber layer.

In principle, all those materials which have already been described as being suitable and particularly suitable for the lower substrate layer can in principle be used as thermoplastic material for the fibrous intermediate layer. A preferably used thermoplastic material is a PP which is prepared in the presence of metallocene as a catalyst and which has an MI in the range from 10 to 60 g/10 min, measured according to DIN 1133 at a temperature of 230° C. under a load of 2.16 kg.

The layer thickness of the fibrous intermediate layer is preferably in the range from 0.01 to 4 mm, particularly preferably from 0.1 to 2 mm, very particularly preferably from 0.2 to 1 mm.

According to the invention, a synthetic adhesive which is liquid under the action of heat but usually solid and which is also referred to in technical language as hotmelt is used as solvent-free adhesive. Examples of such adhesives are so-called PU adhesives based on copolyamides and modified polypropylene. Polyethylene or amorphous poly-alpha-olefins or ethylene/vinyl acetate copolymers may also be used as further base polymers for suitable adhesives. The adhesives may additionally comprise antioxidants or UV stabilizers. Moreover, they occasionally also comprise proportions of resins, such as rosin, terpene or other hydrocarbon resins.

Depending on the field of use, the adhesives are chosen with regard to the adhesion properties on the base materials, the processing temperature, the heat distortion resistance, the chemical stability and the hardness. Hotmelt adhesives are available in granular form, as powder, as film or as rods (also "candles"). PA hotmelt adhesives are partly produced from renewable raw materials and are in principle compostable.

The adhesion particularly on porous materials, such as textile, leather, wood and woven fabrics, and the relatively advantageous price are responsible for the wide use of the relevant adhesives.

The upper layer of the multilayer laminated material according to the invention may be a layer of metal or plastic or wood or wood-like material or a thermosetting plastic film (ready-made laminate).

Pure metals but also metal alloys are advantageously used as the metal. Examples of suitable metals are iron, chromium, nickel, copper, aluminum, brass, zinc, tin, silver and gold.

For example, a metal plate comprising stainless steel, which is preferably about 0.2 mm thick, can be laminated with an adhesive film (hotmelt) in an amount of about 30 g/m$^2$ and with a fibrous intermediate layer (non-woven 30 g/m$^2$) of metallocene polymer in a double-belt press (e.g. from Hymmen) at a temperature of 160° C., under a pressure of 20 bar and at a throughput of 4 m/min.

The invention also relates to a process for the production of the laminated material according to the invention by the injection molding technique. In order to bond the lower substrate layer, which typically has a layer thickness in the range from 0.01 to 20 mm, and the metal plate to give a firmly adhering laminate, the material for the lower substrate layer is introduced into one half of the injection mold and the metal plate into the other half of the injection mold in the injection molding technique. After the mold has been closed, the flexible material (Softell) is injected at a temperature in the range from 150 to 330° C. and under a pressure of from 5 to 2500 bar (=from 0.5 to 250 MPa) between the lower substrate layer and the metal plate. The mold temperature is as a rule from 8 to 160° C. on both sides. After the flexible material has been injected under the stated conditions, the mold is cooled to ambient temperature. The cooling time for this is in the range from 0.01 to 5.0 min.

According to another process variant, a ready-made laminate having a layer thickness in the range from 0.02 to 3.0 mm or alternatively individual films (overlay, decorative paper, resin) is or are first laminated with a non-woven (about 30 g/m$^2$; metallocene polymers, ®Novolen). The material for a lower substrate layer is then prefabricated in a desired thickness and geometry. Both variants are then placed in the respective opposite mold halves of an injection molding chamber, the mold is closed and the flexible material (e.g. Softell) is then injected inbetween into the chamber at a temperature of at least 170° C. and a pressure of at least 50 bar (5 MPa).

According to a further process variant, a root wood veneer (from 0.01 to 6 mm thick) can first be laminated with an adhesive film (hotmelt) and a randomly oriented fiber web at a temperature of 150° C. and a pressure of 10 bar and over a period of 20 s. Thereafter, an aluminum foil is laminated with an adhesive film and a nonwoven (at a temperature of 160° C., a pressure of 25 bar and a pressing time of 20 s). The two laminated parts are then placed in each case in a mold half of an injection molding apparatus, and flexible material (e.g. Softell) is then injected at a temperature of 180° C. and a pressure of 50 bar between the two initially taken laminated semi-finished products. The mold temperature is about 8° C.

In a pressing process, in principle the same process takes place. The only difference is that the flexible material (e.g. Softell) is introduced in granular form between the individual films introduced in the layer sequence and is subjected to at least 5 bar pressure and a press temperature of at least 100° C. on both sides and a pressing time of at least 30 sec.

The same procedure has proven outstanding in practice in injection stamping and transfer molding.

Owing to their structure, the multilayer laminates according to the invention are absolutely flat even under a thermal exposure of less than 50° C. over a period of 40 days. The flexible material completely compensates for the buildup of internal stresses and the results of the bimetallic effect. The intermediate layer comprising flexible material, which may have a layer thickness in the range from 0.02 to 10 mm, absorbs the distortion or the shrinkage of the thermoplastic polymer completely.

Extrusion/Profile Extrusion Process Variant:

In order to ensure the production of a multilayer laminate by an extrusion process, for example through a slot die, the flexible material (e.g. Softell) is plastified at a melt temperature of at least 150° C. and then applied at a pressure of at least 1 bar to the calender rolls or double-belt presses, which are adjusted to a temperature in the range from 1 to 250° C.

Above the calender rolls/double-belt press, for example, a previously coated aluminum foil is allowed to run in concomitantly. Below the calender roll/double-belt press, a sheet (about 3 mm thick) of thermoplastic polymer is allowed to run in concomitantly. The lamination of the laminates pre-laminated in this manner takes place under a roll pressure greater than or equal to 1 bar and gives an interlocking and flat combination of the different materials in the laminate on one side.

In profile extrusion the two sheets to be laminated (e.g. metal and plastic) are pre-shaped and, prior to sizing, are laminated with a flexible material (e.g. Softell) at a temperature of at least 150° C. but with profiled rolls at a pressure greater than or equal to 1 bar.

Injection Stamping/Transfer Molding Process Variant:

As in the case of injection molding, in injection stamping a previously coated sheet (metal/wood veneer) is introduced on the ejector side of the injection stamping mold and a sheet of a thermoplastic polymer is introduced on the opposite side. The plastified flexible material (e.g. Softell) is then initially taken at a temperature of at least 150° C. in the mold closed to a degree of about 80%. An interlocking bond comes into being at elevated temperature as a result of the subsequent closing of the two mold halves (stamping).

On the other hand, in transfer molding, for example, a metal foil is introduced on one of the two sides of a transfer molding chamber and a sheet of thermoplastic polymer on the other side. By means of a movable injection molding machine, the flexible material (e.g. Softell) is injected between the metal foil and the polymer sheet at a melt temperature of 160° C. After this process, the press closes under a pressure of at least 5 bar and for a pressing time of at least 3 s. The subsequently removed multilayer laminate is absolutely flat after the cooling time to ambient temperature.

The working examples described below may be varied if needed and according to requirement profiles. This means that all customary materials can be bonded to one another in an interlocking manner and completely without bimetallic effect. The results of examples 1 to 10 according to the invention and the results of the comparative examples are compared at the very end in table I.

EXAMPLE 1

A multilayer laminate comprising aluminum foil and polypropylene and having the following structure was produced:

An aluminum foil having a layer thickness of 0.1 mm was first coated with an adhesive film of thermoplastic in a layer thickness corresponding to a weight per unit area of 25 g/m². A woven fabric comprising metallocene polypropylene having a melting point of 148° C. was then laminated thereon with a weight per unit area of 25 g/m² so that the adhesive film could form a firmly adhering bond with the woven fabric.

This now coated and laminated aluminum foil was then placed in an injection mold. The flexible material Softell having a melt flow index $MI_{(2.16/230° C.)}$ of 12 g/10 min was plastified at a temperature of 150° C. and injected under a pressure of 50 bar (=5 MPa) toward the back of the coated and laminated aluminum foil placed in the injection mold.

A polypropylene filled with 20% by weight of talc was then also used as substrate material. The polypropylene had an $MI_{(2.16/230° C.)}$ of 15 g/10 min.

EXAMPLE 2

Multilayer Laminate: Thermosetting Plastic Film*—Polypropylene (*Melamine/Decorative Paper)

The thermosetting plastic film can in principle be initially taken as a compact film or as individual sheets (overlay, decorative paper, kraft paper; adhesive bond of melamine and phenol resins. In the case of the compact variant as well as in the case of the variant comprising individual sheets, a laminated nonwoven (weight per unit area: 30 g/m²) is present on the back of the thermosetting plastic film (Metocene, Novolen; hydrophobic).

The thermosetting plastic film laminated with nonwoven was placed in one mold half of an injection molding chamber. A cooled polypropylene sheet was introduced into the other mold half. After the mold had been closed, the flexible material (Softell) having an $MI_{(2.16/230° C.)}$ of 15 g/10 min and a melt temperature of 230° C. was injected between the introduced parts under a pressure of 120 bar.

EXAMPLE 3

Multilayer Laminate: Wood Veneer—Aluminum Foil—ABS

The wood veneer (raw veneer or coated on one side) was laminated with an adhesive film (weight per unit area: 20 g/m²) and a nonwoven (Metocene, 25 g/m²) at a temperature of 160° C., under a pressure of 10 bar and with a feed of 4 m/min on a double-belt press.

An aluminum foil was laminated on one of its surfaces with an adhesive film (weight per unit area: 20 g/m²) and a nonwoven (Metocene, 30 g/m²) and on the other surface with an adhesive film (weight per unit area: 25 g/m²) and a polyester/polypropylene nonwoven (25 g/m²).

A flexible material (Softell) in the form of a film having a layer thickness of 0.3 mm was then placed between the wood veneer and that surface of the aluminum foil which was coated with a Metocene nonwoven. Flexible material (Softell) in the form of a film having a layer thickness of 0.4 mm was placed on the other side of the aluminum foil, which had been coated with the polyester/polypropylene nonwoven. A previously adhesive-coated ABS sheet (adhesive film: 20 g/m$^2$) and nonwoven (Metocene, 25 g/m$^2$) was then arranged thereon as a final top layer.

This total laminate was then pressed in a press at a temperature of 150° C. and under a pressure of 15 bar for a time period of 8 s. After a cooling phase of 5 min, the laminate was absolutely flat.

EXAMPLE 4

Multilayer Laminate: Thermosetting Plastic—Polyamide/ABS/Polycarbonate

The thermosetting plastic film can be initially taken as a compact film or as individual sheets (overlay, decorative paper, kraft paper; adhesive bond of melamine and phenol resins). In the case of the compact variant as well as in the case of the variant comprising individual sheets, a laminated polyester nonwoven (weight per unit area: 30 g/m$^2$) is present on the back. An adhesive film was applied to the free surface of this polyester nonwoven, and a further Metocene nonwoven (weight per unit area: 25 g/m$^2$) was placed on top.

Thereafter, the thermosetting plastic film laminated with nonwoven was placed in one mold half of an injection molding chamber, and a cooled polyamide sheet laminated with adhesive film and Metocene nonwoven was placed in the other mold half. After the mold has been closed, the flexible material (e.g. Softell) having a melt flow rate of 15 g/10 min and a melt temperature of 230° C. is injected under a pressure of 120 bar between the parts introduced.

EXAMPLE 5

Multilayer Laminate: Wood—Polypropylene

A wood veneer (0.2 mm thick) was laminated with an adhesive film and a Metocene nonwoven (weight per unit area in each case: 25 g/m$^2$) and introduced into one side of a mold for injection molding production. A polypropylene sheet was arranged on the other side of the mold. After the mold had been closed, the flexible material (Softell) having a melt flow index MI$_{(2.16/230°\ C.)}$ of 15 g/10 min at a melt temperature of 230° C. was injected under a pressure of 120 bar between the parts introduced.

EXAMPLE 6

Multilayer Laminate: Steel—ABS/Polyamide/Polystyrene/Polycarbonate

An initially taken stainless steel foil (1.4301 according to DIN X5CrNi18-10 having a thickness of 0.2 mm) was laminated on one of its two surfaces with an adhesive film and a Metocene nonwoven (weight per unit area in each case 30 g/m$^2$) and introduced into one side of a mold for injection molding production.

A sheet comprising a blend of ABS/polyamide/polystyrene/polycarbonate in equal parts by weight in each case was laminated on one of its two surfaces with an adhesive film and a Metocene nonwoven (30 g/m$^2$) and introduced into the other side of the mold. After the mold had been closed, flexible material (Softell) having a melt flow index MI$_{(2.16/230°\ C.)}$ of 15 g/10 min at a melt temperature of 230° C. was injected under a pressure of 120 bar between the parts introduced.

EXAMPLE 7

Multilayer Laminate: Copper—PP/Polyamide/ABS

An initially taken copper foil (0.2 mm thick) was laminated with an adhesive film and a Metocene nonwoven (weight per unit area in each case 25 g/m$^2$) and introduced into one side of a mold for injection molding production.

The substrate comprising a blend of PP/polyamide/ABS in equal parts in each case was laminated with an adhesive film and a Metocene nonwoven (weight per unit area in each case 25 g/m$^2$) and introduced into the other side of the mold.

After the mold had been closed, the flexible material (Softell) having a melt flow index MI$_{(2.16/230°\ C.)}$ of 15 g/10 min at a melt temperature of 230° C. was injected under a pressure of 120 bar between the parts introduced.

EXAMPLE 8

Multilayer Laminate: Wood—Polypropylene

The wood veneer (1 mm thick) was laminated with an adhesive film and a Metocene nonwoven (weight per unit area in each case 25 g/m$^2$) and introduced into one mold half of an injection molding chamber.

After the mold had been closed, the flexible material (Softell) having a melt flow index MI$_{(2.16/230°\ C.)}$ of 15 g/10 min at a melt temperature of 230° C. was injected under a pressure of 120 bar between the parts introduced.

EXAMPLE 9

Multilayer Laminate: Steel—Wood

The wood veneer (1 mm thick) was laminated with an adhesive film and a Metocene nonwoven (weight per unit area in each case 25 g/m$^2$) and introduced into one mold half of an injection molding chamber.

A stainless steel foil (1.4301 according to DIN X5CrNi18-10 having a thickness of 0.4 mm) was laminated with an adhesive film and with a Metocene nonwoven (weight per unit area in each case 20 g/m$^2$) and introduced into the other mold half.

After the mold had been closed, the flexible material (Softell) having a melt flow index MI$_{(2.16/230°\ C.)}$ of 15 g/10 min at a melt temperature of 230° C. was injected under a pressure of 120 bar between the parts introduced.

EXAMPLE 10

Multilayer Laminate: Polypropylene—Polyurethane

First an adhesive film and then a Metocene nonwoven (weight per unit area in each case 25 g/m$^2$) were laminated onto a surface of a polypropylene sheet. A Soften film (0.3 mm thick) and an adhesive film (weight per unit area: 25 g/m$^2$) were placed on this laminated polypropylene sheet and introduced into one half of a mold for injection molding production.

After the mold had been closed, polyurethane foam was applied under pressure (5 bar) to the laminated side of the polypropylene sheet.

COMPARATIVE EXAMPLE 1

Laminate: Thermosetting Plastic—Polypropylene

A thermosetting plastic film was introduced into one mold half of an injection molding chamber and a polypropylene was injected directly at the back.

After the injection molded sheet had cooled, deformation of the laminate, comparable with a bimetallic effect, was immediately visible.

COMPARATIVE EXAMPLE 2

Laminate: Aluminum—Polyamide

An aluminum foil was laminated with an adhesive film and a polyester nonwoven (weight per unit area in each case 20 g/m²) and then introduced into one mold half of an injection molding chamber. The laminated aluminum foil was then injected directly at the back with a polyamide.

After the injection molded sheet had cooled for a time of about 10 min, a substantial deformation of the laminate produced, comparable with a bimetallic effect, was immediately visible.

COMPARATIVE EXAMPLE 3

Laminate: Wood—ABS/Polycarbonate

A wood veneer (1 mm thick) was laminated on one surface with an adhesive film and a polyester nonwoven (weight per unit area in each case 25 g/m²) and then introduced into one mold half of an injection molding chamber. After the mold had been closed, a mixture of ABS/polycarbonate in equal parts was injected directly on to the laminated surface.

After the injection molded sheet had cooled for a time of about 15 min, deformation of the laminate produced, comparable with a bimetallic effect, was immediately clearly visible.

COMPARATIVE EXAMPLE 4

Laminate: Steel—Polypropylene

A steel foil (0.2 mm thick) was laminated on one of its two surfaces with an adhesive film and with a Metocene nonwoven (weight per unit area in each case 25 g/m²) and introduced into one mold half of an injection molding chamber.

After the mold had been closed, polypropylene was injected directly onto the laminated surface of the steel foil.

Directly after removal of the laminate thus produced, a substantial deformation, comparable with a bimetallic effect, was observed.

All results of the examples and of the comparative examples are compared in the following table.

We claim:

1. A solvent-free multilayer laminated material, which comprises a lower substrate layer comprising a thermoplastic polymer or a mixture of thermoplastic polymers, an intermediate layer arranged thereon and comprising a flexible material, a further fibrous intermediate layer which comprises plastic and is provided with an adhesive material, and an upper layer comprising metal, plastic, or wood, the flexible material of the intermediate layer comprising a mix of a crystalline polymer fraction and an elastomeric fraction, wherein the crystalline fraction is present in an amount of about 5 to 25% by weight and the elastomeric fraction is present in an amount of about 75 to 92% by weight, both calculated on total weight of the mix, having rubber-elastic properties at room temperature and having a glass transition temperature $T_g$ of lower than 0° C., wherein the lower substrate layer is an injection molded or extruded or pressed sheet having an overall thickness in the range from 1 to 20 mm throughout its entire cross-section wherein the fibrous intermediate layer comprises, as thermoplastic material, a polypropylene which is prepared in the presence of metallocene as a catalyst and has a melt flow index $MI_{(2.16/230° C.)}$ in the range from 10 to 60 g/10 min, measured according to DIN 1133 at a temperature of 230° C. and under a load of 2.16 kg.

2. The multilayer laminated material according to claim 1, which comprises, as a thermoplastic polymer for the lower substrate layer selected from the group consisting of polypropylene (PP), polyethylene (PE), polyvinyl chloride (PVC), polysulfones, polyether ketones, polyesters, polycycloolefins, polyacrylates, polymethacrylates, polyamides, polycarbonate, polyurethanes, polyacetals, polystyrene (PS) and blends thereof.

3. The multilayer laminated material according to claim 2, wherein the thermoplastic polymer of the substrate layer additionally comprises an amount of from 1 to 60% by weight, based on the weight of the lower substrate layer, of reinforcing fillers.

4. The multilayer laminated material according to claim 3, wherein the thermoplastic polymer of the substrate layer comprises reinforcing fillers selected from the group consisting of barium sulfate, magnesium hydroxide, talc having a mean particle size in the range from 0.1 to 10 μm, measured according to DIN 66 115, wood, flax, chalk, glass fibers, coated glass fibers, short glass fibers, long glass fibers, glass beads and mixtures thereof.

TABLE I

|  | Temperature change | | | Peeling test 90° | Odor test 75° C. | |
| --- | --- | --- | --- | --- | --- | --- |
|  | −30° C. | +23° C. | +90° C. | 10 N | GME 60276 | Bimetallic effect |
| Example 1 | OK | OK | OK | OK | <3 | No |
| Example 2 | OK | OK | OK | OK | <3 | No |
| Example 3 | OK | OK | OK | OK | <3 | No |
| Example 4 | OK | OK | OK | OK | <3 | No |
| Example 5 | OK | OK | OK | OK | <3 | No |
| Example 6 | OK | OK | OK | OK | <3 | No |
| Example 7 | OK | OK | OK | OK | <3 | No |
| Example 8 | OK | OK | OK | OK | <3 | No |
| Example 9 | OK | OK | OK | OK | <3 | No |
| Comparative example 1 | OK | OK | Delam. | 5 N OK | >8 | Yes |
| Comparative example 2 | OK | OK | Delam. | 5 N OK | >8 | Yes |
| Comparative example 3 | OK | OK | Delam. | 5 N OK | >8 | Yes |
| Comparative example 4 | Delam. | OK | Delam. | 5 N OK | >8 | Yes |

5. The multilayer laminated material according to claim 1, wherein the fibrous intermediate layer comprising a thermoplastic polymer has a weight per unit area in the range from 10 to 200 g/m² and is provided with a solvent-free adhesive in an amount from 5 to 200 g/m².

6. The multilayer laminated material according to claim 1, which comprises a woven textile fabric or a randomly oriented fiber web as the fibrous intermediate layer.

7. The multilayer laminated material according to claim 1, wherein the layer thickness of the fibrous intermediate layer is in the range from 0.01 to 4 mm.

8. The multilayer laminated material according to claim 1, wherein the fibrous intermediate layer comprises, as solvent-free adhesive, a synthetic adhesive which is liquid under the action of heat.

9. The multilayer laminated material according to claim 1 wherein the upper layer is a layer comprising veneer wood, aluminum, stainless steel or a thermosetting plastic.

10. A process for the production of a multilayer laminated material according to claim 1, in which, according to the injection molding technique, the material for the lower substrate layer is introduced into one half of an injection mold and the material for the upper layer into the other half of the injection mold, wherein, after the mold has been closed the flexible material is injected between the lower substrate layer and the upper layer at a temperature in the range from 150 to 330° C. and under a pressure of from 5 to 2500 bar.

11. The process according to claim 10, wherein the mold temperature is in the range from 8 to 160° C.

12. The process according to claim 10, wherein, after the flexible material has been injected, the mold is cooled to ambient temperature, the cooling time being in the range from 0.01 to 5.0 min.

* * * * *